United States Patent [19]

Sezai

[11] Patent Number: 5,432,519
[45] Date of Patent: Jul. 11, 1995

[54] METHOD OF PERFORMING BEAM COMPRESSION PROCESS ON ANTENNA PATTERN OF RADAR

[75] Inventor: Toshihiro Sezai, Tokyo, Japan

[73] Assignee: National Space Development Agency of Japan, Tokyo, Japan

[21] Appl. No.: 209,901

[22] Filed: Mar. 14, 1994

[30] Foreign Application Priority Data

Apr. 22, 1993 [JP] Japan ................... 5-117575

[51] Int. Cl.[6] .............................. G01S 5/02
[52] U.S. Cl. ........................ 342/149; 342/427
[58] Field of Search ............... 342/427, 373, 149

[56] References Cited

U.S. PATENT DOCUMENTS

| | | | |
|---|---|---|---|
| 2,567,197 | 9/1951 | Fox . | |
| 3,778,824 | 12/1973 | Roger . | |
| 5,248,984 | 9/1993 | Sezai | 342/427 |
| 5,268,697 | 12/1993 | Sezai | 342/427 |
| 5,302,961 | 4/1994 | Murrow et al. | 342/427 |

FOREIGN PATENT DOCUMENTS 1791200 11/1971 Germany .

OTHER PUBLICATIONS

"Introduction to Radar Systems", MI. Skolnik McGraw Hill, 1980 pp. 160–164.
European Search Report (application No. EP 94 30 1787), dated Jul. 18, 1994.

*Primary Examiner*—Mark Hellner
*Attorney, Agent, or Firm*—Armstrong, Westerman, Hattori, McLeland & Naughton

[57] ABSTRACT

An antenna system comprising two similar radiation antenna elements with a single monopulse feed system is scanned while transmitting in-phase radio waves from the two elements. Reflected radio waves are received by the two elements and fed to a hybrid circuit which in turn produces a sum signal $\Sigma$ and a difference signal $\Delta$. After detection is performed by a detector, a signal processing unit subtracts the difference signal $\Delta$ from the sum signal $\Sigma$. In this processing step, the output signal produced by the above subtraction process is actually output only if the receiving pattern waveform associated with the sum signal $\Sigma$ has an upwardly convex form, that is, its double differential coefficient is negative and further if the receiving pattern waveform associated with the difference signal $\Delta$ has a downwardly convex form, that is, its double differential coefficient is positive, whereby an antenna pattern with beam compression is provided.

1 Claim, 6 Drawing Sheets

METHOD OF PERFORMING BEAM COMPRESSION PROCESS ON ANTENNA PATTERN OF RADAR

BACKGROUND OF THE INVENTION

1. FIELD OF THE INVENTION

The present invention relates to a method of performing beam compression of an antenna pattern, which can provide better performance in the beam compression process of an antenna pattern of a radar including a monopulse power feed system.

2. DESCRIPTION OF THE RELATED ART

In general, a beam width is one of indices representing the performance of an antenna pattern of a receiving antenna or of other types of antennas. A narrower beam width in an antenna pattern will yield a better performance. However, there is an inverse relationship between a beam width and the size (length) of an antenna. Therefore, if the beam width is reduced, then the size of the antenna will be increased. Conversely, if the dimension of the antenna is reduced, then the beam width will be broadened.

For example, in an antenna for a radar system, if it is desired to double the ability or the resolution to discriminate objects, it is required to halve the beam width and thus it is required to double the size of the antenna. The doubling of the size leads to not only a larger occupied region but also various disadvantages such as an increase in the weight of the antenna and in the size of a structure for supporting the antenna. Conversely, if the size of an antenna is halved, then the beam width will be doubled and the discrimination ability will be degraded by a factor of two.

It is well known that there is such a conflicting relationship between a beam width and the size of an antenna. In most cases, an actual antenna has a limitation in the region it can occupy. Therefore, under these limited conditions, a certain degree of compromise associated with the beam width has to be made.

One known beam compression technique which alleviates the above-described problems is to employ two similar antennas with a monopulse power feed system so as to reduce the beam width by subtracting the difference signal pattern between the two antennas from the sum signal pattern of the two antennas. FIG. 1 is a schematic diagram illustrating a radar system which can perform the beam compression in such a manner as described above. In this figure, reference numerals 101,101 designate a pair of antennas with a monopulse power feed system, wherein each antenna has a length of a, and the center-to-center distance between the antennas is d. Reference numeral 102 designates a power divider and reference numeral 103 designates a transmission circuit. The transmission circuit 103 generates the transmission power, which is fed in the same phase to the antennas 101 via the power divider 102. Reference numeral 104 designates a hybrid circuit which produces a sum signal $\Sigma$ and a difference signal $\Delta$ from receiving signals of the two antennas 101,101. Reference numeral 105 designates a detector for detecting the sum signal $\Sigma$ and the difference signal $\Delta$, and reference numeral 106 designates a differential amplifier which provides an antenna output signal by subtracting the difference signal $\Delta$ from the sum signal $\Sigma$.

In the radar system having the configuration described above, the differential amplifier 106 provides the antenna output signal produced by subtracting the difference signal $\Delta$ from the sum signal $\Sigma$. One aspect of the antenna output signal is shown in FIG. 2 in a general representing manner of a power pattern associated with beam compression. That is, in FIG. 2, the broken line represents the sum signal $\Sigma$ of the receiving signals of the two antennas, and the alternate long and short lashed line represents the difference signal $\Delta$. The solid line represents the output signal $(\Sigma-\Delta)$ which is the difference between these two signals. As can be seen, the output signal shows a synthetic directional characteristic having a compressed beam width.

A radar system which performs beam compression according to a conventional technique as described above can provide a certain degree of beam compression. However, if there are a large number of scattering objects in a direction of radio wave radiation, the difference signal $\Delta$ will become small compared to the sum signal $\Sigma$. As a result, the final output signal value obtained by subtracting the difference signal $\Delta$ from the sum signal $\Sigma$ will have only a slight difference from the value of the sum signal $\Sigma$. This means that there is a problem in that efficient effects of beam compression cannot be achieved.

SUMMARY OF THE INVENTION

It is an object of the present invention to improve the above-described problem in tile conventional technique of beam width compression of an antenna pattern. More specifically, it is an object of the present invention to provide a method for compressing the beam width of an antenna pattern of a radar antenna, which can more effectively compress the beam width.

To solve the foregoing problem, the present invention provides a method for compressing the beam width of the antenna pattern of a radar system including a radar antenna system having two similar radiating antenna elements in a single monopulse feed system comprising the steps of: scanning the antenna system while transmitting radio waves from the two elements of the antenna system in such a manner that both the radio waves transmitted from the respective elements are in the same phase; receiving by the antenna system the radio waves which were transmitted from the antenna system and reflected by a scattering object producing a sum signal and a difference signal of the received signals of the two elements of the antenna system; and performing a signal processing operation comprising the steps of subtracting the difference signal from the sum signal and providing the resulting signal as a final antenna output signal, wherein the above-described signal processing step further comprises the step of providing the final antenna output signal only if the double differential coefficient of the receiving pattern waveform associated with the sum signal is negative and further if the double differential coefficient of the receiving pattern waveform associated with the difference signal is positive whereas providing a zero output signal if the above conditions are not satisfied.

In general, when objects to be observed are distributed discretely as in the case of a radar, the receiving pattern waveform has an upwardly convex form near the angle at which an object exists, whereas it does not have an upwardly convex form near the angles at which no object exists. In the case of a beam compression method for a radar antenna system employing two similar antennas with a monopulse feed system, in which the reduction in the beam width is achieved by means of a process using the sum signal and the difference signal of receiving signals of respective antennas wherein the beam compression process is carried out by subtracting the difference signal pattern from the sum signal pattern, the receiving pattern waveform associated with the sum signal has an upwardly convex form near the angle at which an object exists as represented by the broken line in FIG. 2. In contrast, however, the receiving pattern waveform associated with the difference signal has a downwardly convex form near the angle at which an object exists, and the waveform gradually changes to an upwardly convex form as the angle departs from that at which the object exist, as represented by the alternate long and short dash line in FIG. 2.

In the present invention, therefore, only if the receiving pattern waveform associated with the sum signal has an upwardly convex form, that is, its double differential coefficient is negative, and furthermore if the receiving pattern waveform associated with the difference signal has a downwardly convex form, that is, its double differential coefficient is positive, the signal which is produced by subtracting the difference signal from the sum signal is provided as the output signal, and a zero output signal is provided if the above conditions are not satisfied. Thus, the output signal is provided only in the regions where the receiving pattern waveform associated with the sum signal represented by the broken line in the power pattern of FIG. 2 has an upwardly convex form and the receiving pattern waveform associated with the difference signal represented by the alternate long and short dashed line has a downwardly convex form. As a result, the output signal is provided in such a manner as represented by the solid line in FIG. 3, which shows a significant improvement of beam compression effect. In FIG. 3, the broken lines represent the regions where the receiving pattern waveform associated with the sum signal has an upwardly convex form, and the alternate long and short dashed lines represent the regions where the receiving pattern waveform associated with the difference signal has a downwardly convex form.

DESCRIPTION OF THE PREFERRED EMBODIMENTS

Figure 4:
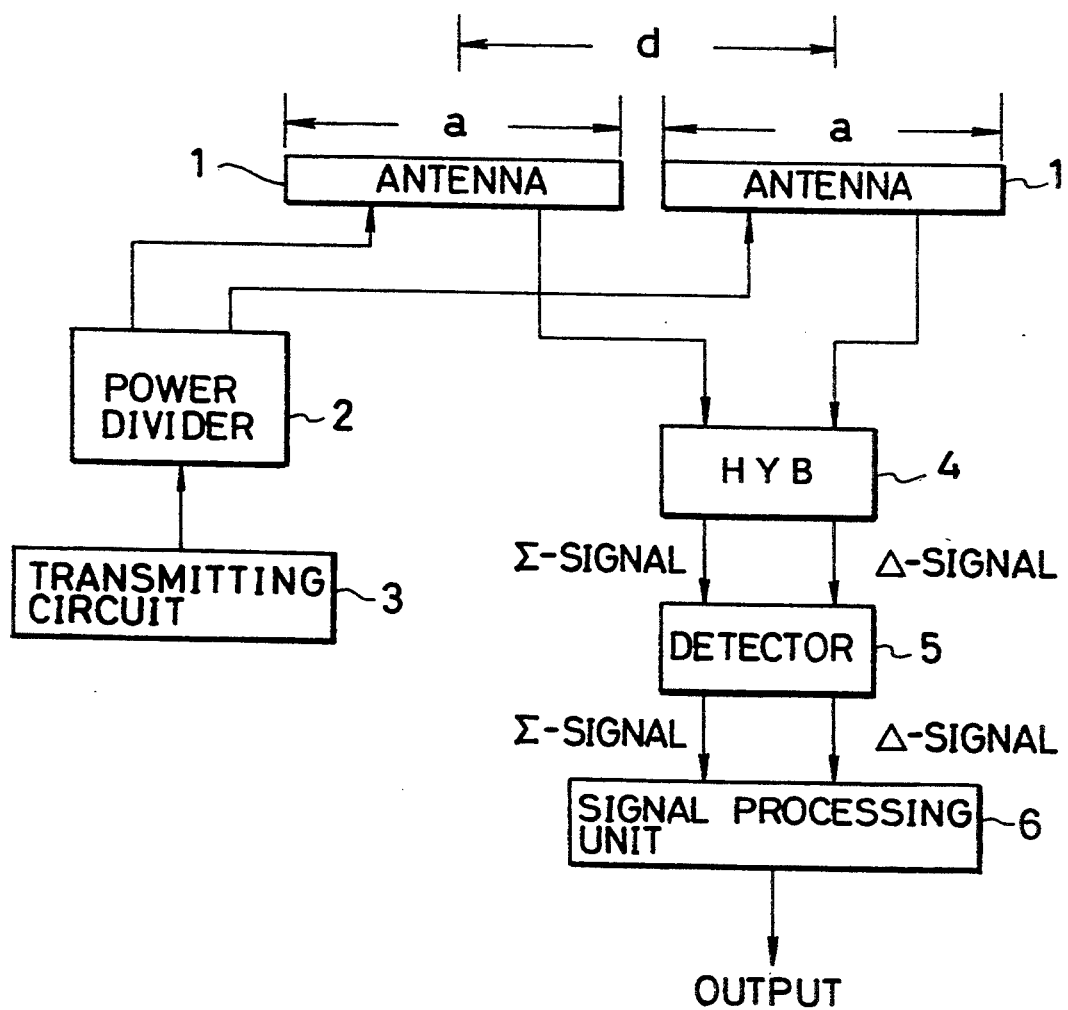
FIG. 4 is a schematic diagram showing a configuration of a radar system for use of explanation on a method of the beam compression of the antenna pattern in a radar system according to an preferred embodiment of the present invention.

A preferred embodiment of the present invention will be described in detail below. FIG. 4 is a simplified diagram showing a configuration of a radar system for use of explanation on a method of beam compression in the antenna pattern of a radar system according to one embodiment of the present invention. In FIG. 4, reference numerals 1, 1 designate two transmitting/receiving antenna elements of an antenna system, each antenna element having the same structure such as a horn antenna or an array antenna with a monopulse feed system, wherein each antenna element has a length of "a", and the center-to-center distance between the antennas is d. Reference numeral 2 designates a power divider and reference numeral 3 designates a transmission circuit. The transmission circuit 3 generates transmission power, which is fed in the same phase to the antennas 1, 1 via the power divider 2. Reference numeral 4 designates a hybrid circuit which produces a sum signal $\Sigma$ and a difference signal $\Delta$ from receiving signals of the two antennas 1, 1. Reference numeral 5 designates a detector, and reference numeral 6 designates a signal processing unit for providing an output signal which is produced by subtracting the difference signal $\Delta$ from the sum signal $\Sigma$ if the receiving pattern waveform associated with the sum signal $\Sigma$ detected by the detector 5 has an upwardly convex form, that is, its double differential coefficient is negative and if the receiving pattern waveform associated with the difference signal $\Delta$ has a downwardly convex form, that is, its double differential coefficient is positive whereas providing a zero output signal if the above conditions are not satisfied.

In the radar system configured in the manner described above, the transmission circuit 3 provides transmission power via the power divider 2 to the antenna system comprising the antenna elements 1, 1, then the antenna system scans the antenna beam while transmitting radio waves. When the transmitted radio wave returns after it was reflection by a scattering object, it is received by the antennas elements 1, 1 and then it is input to the hybrid circuit 4 which in turn provides a sum signal $\Sigma$ corresponding to a sum signal pattern and also provides a difference signal $\Delta$ corresponding to a difference signal pattern. The sum signal $\Sigma$ and the difference signal $\Delta$ are detected by the detector 5, and then are subjected to the above-described signal processing in the signal processing unit 6 so as to provide an output corresponding to an antenna pattern having improved beam compression characteristics.

Figure 1:
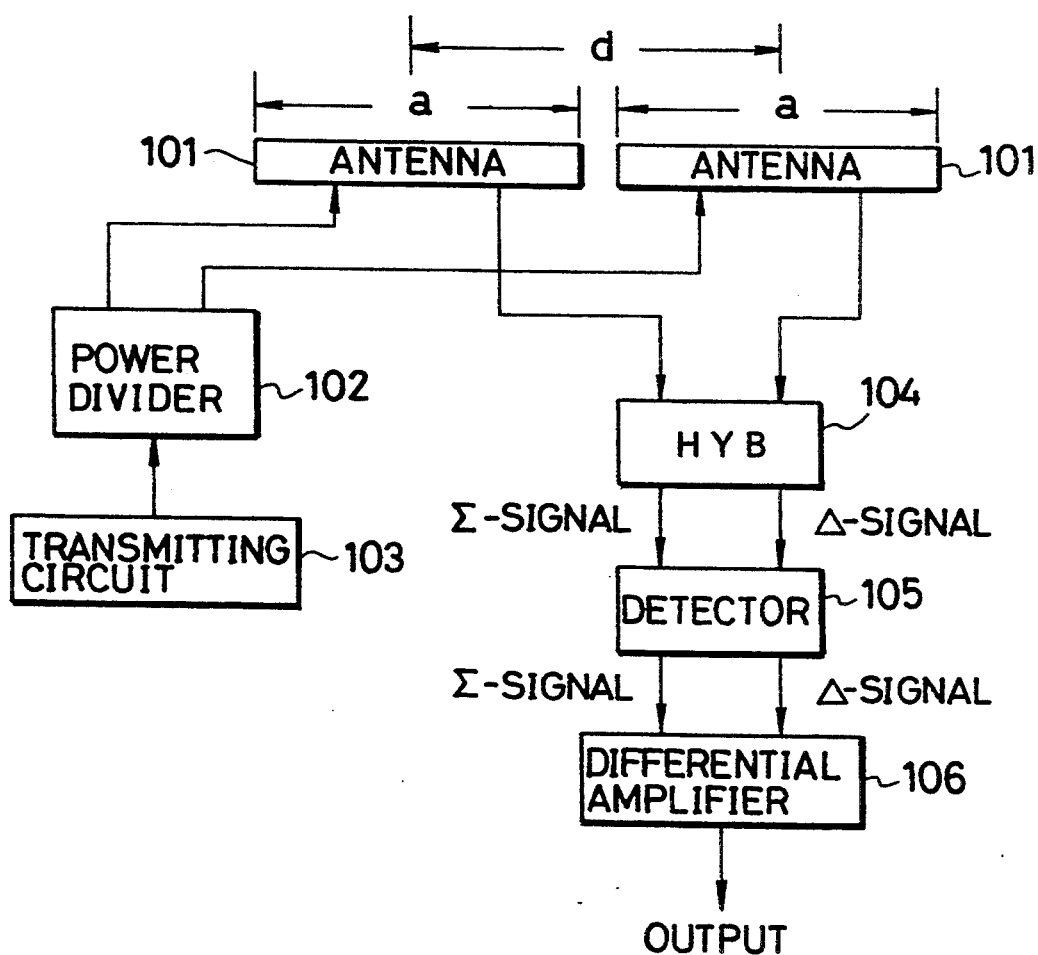
FIG. 1 is a schematic diagram showing a configuration of a conventional radar system.
Figure 2:
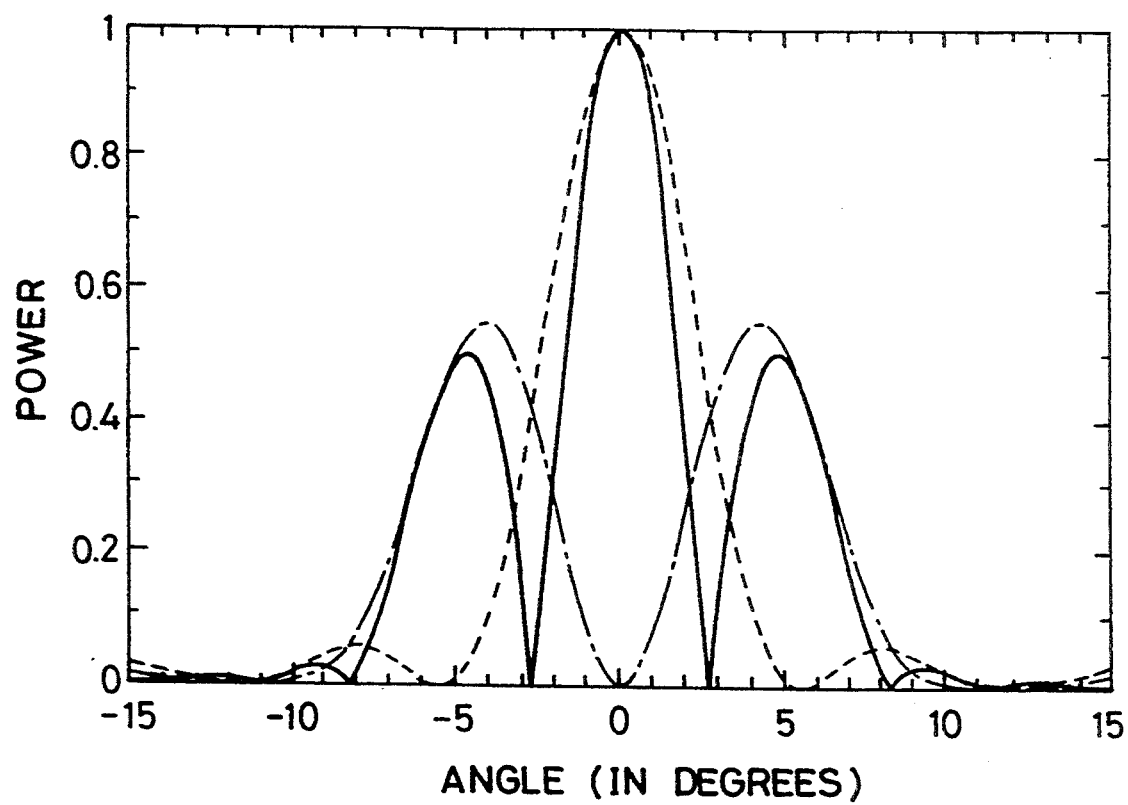
FIG. 2 is a schematic representation of waveforms of a sum signal, difference signal, and an output signal relating to the beam compression processing in a radar system according to a conventional technique.
Figure 3:
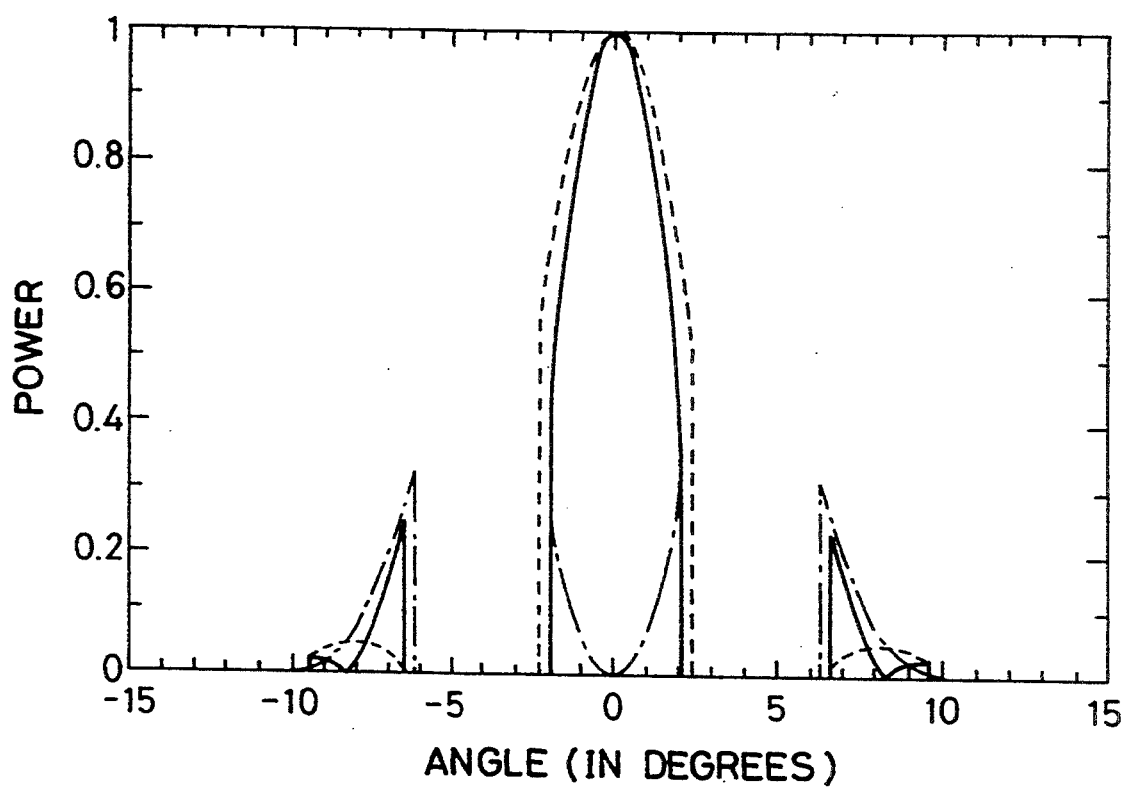
FIG. 3 is a schematic representation of an output signal which is obtained as a result of the beam compression processing of the antenna pattern in a radar system according to a preferred embodiment of the present invention.
Figure 5:
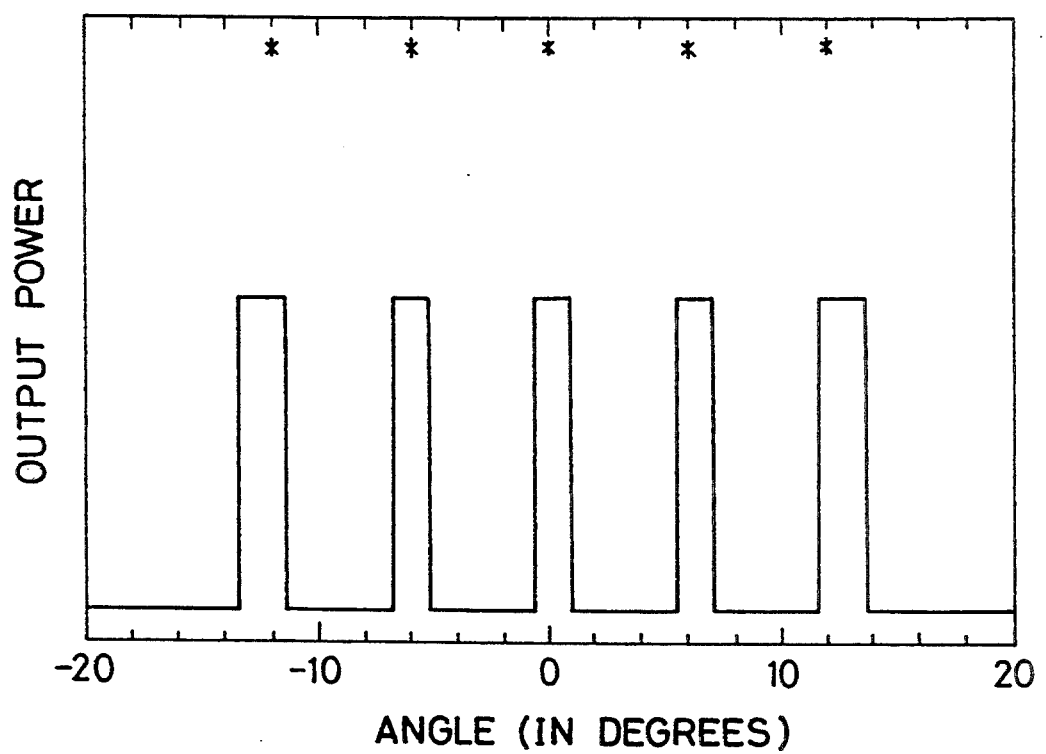
FIG. 5 is a schematic representation of an output power pattern obtained as a result of simulation on the radar system of FIG. 4.

FIG. 5 shows a result of simulation on the radar system shown in FIG. 4 wherein the simulation was done assuming that the antenna system is configured with uniformly distributed horn antenna elements 1, 1 having a length "a" which is five times the wavelength of the receiving radio wave and that center-to-center distance between the antennas is 1.04 times the antenna length a. This simulation result shows the final output power pattern obtained under the condition that there are point scattering objects, which are electromagnetically equivalent to each other, in the directions of $-12°$, $-6°$, $0°$, $6°$, and $12°$ about the rotation axis of the antenna system wherein all the scattering objects exist at the same distance from the antenna system. For comparison to the beam compression method according to the present invention, FIG. 6 shows a final output power pattern obtained in the radar system shown in FIG. 1 using a conventional method of beam compression.

Figure 6:
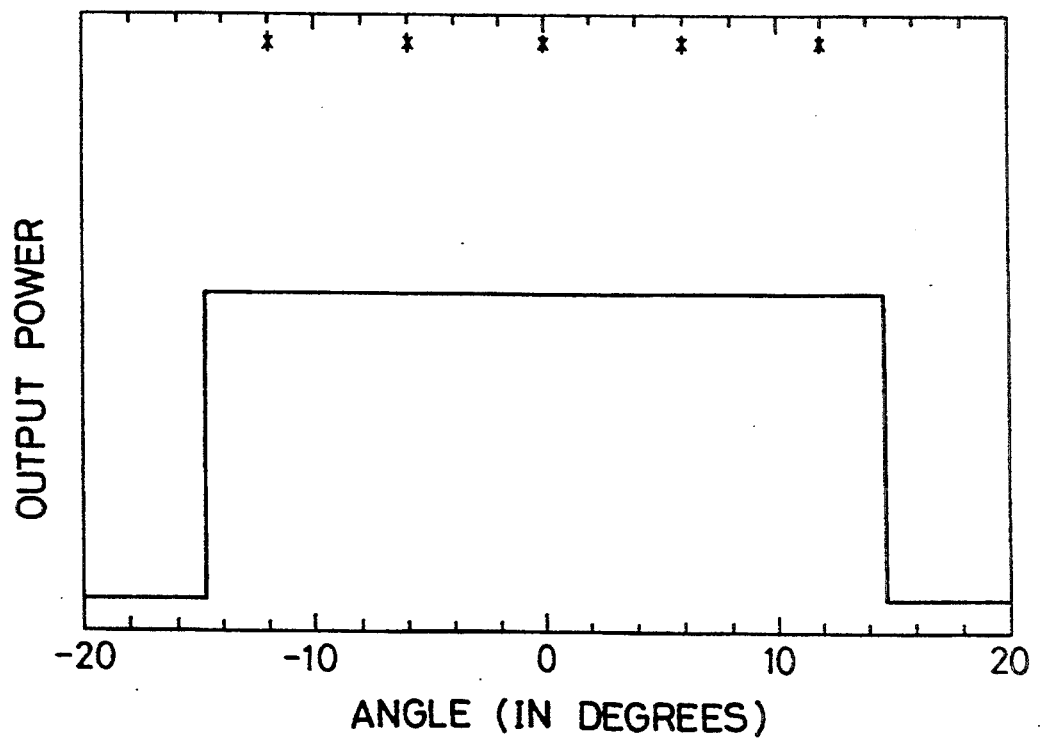
FIG. 6 is a schematic representation of an output power pattern obtained as a result of simulation on a conventional radar system.

In the representations of the simulated power patterns shown in FIGS. 5 and 6, a "1" is output when the output power is greater than 0.1 relative to the reference value which is set to the maximum output power obtained when there is only one point scattering object, and a "0" or nothing is output in the other cases. In these representations, it is determined that a "1" is output when the output power is greater than 0.1 relative to the reference value, because of the fact that a CRT display of a radar system has a dynamic range of about 10 dB. Marks * shown in the upper portions of FIGS. 5 and 6 denote the positions of the scattering objects.

As can be seen from FIGS. 5 and 6, the method of beam compression according to the present invention can provide a final output pattern waveform having good consistency with the distribution of scattering objects even under the conditions where the conventional beam compression method results in a final output pattern waveform having great inconsistency with the distribution of scattering objects, which means that the present invention can provide more effective beam compression than the conventional method.

Figure 7:
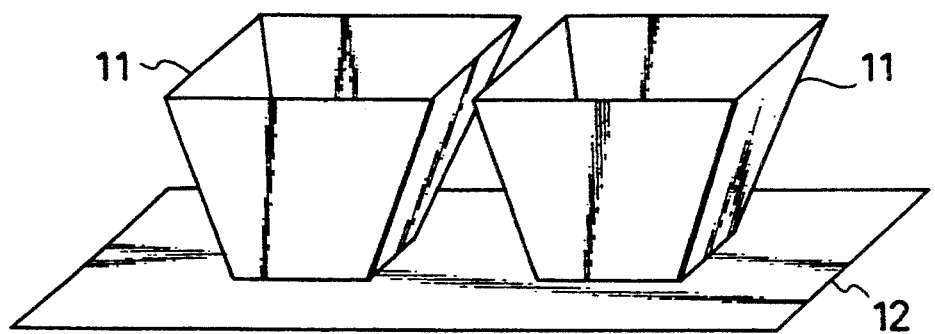
FIG. 7 is a perspective view illustrating a specific configuration of an antenna system of the radar system of FIG. 4.
Figure 8:
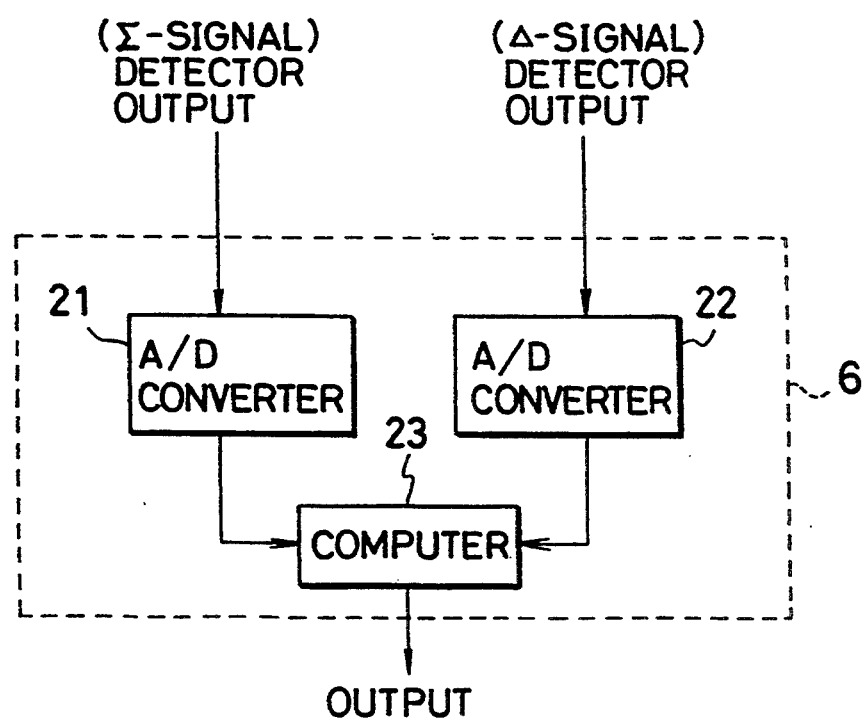
FIG. 8 is a schematic diagram illustrating a specific configuration of a signal processing unit of the radar system of FIG. 4.

FIG. 7 shows a specific example of the configuration of the antenna system of the radar system shown in FIG. 4. In this example of the configuration, the antenna system comprises horn antenna elements, 11, 11 having the same structure, and an element 12 for supporting the antennas. The signal processing unit 6 shown in FIG. 4 may be configured by using known means or techniques in such a manner that after a receiving signal is converted to a digital signal by an analog-to-digital (A/D) converter, the calculation of a double differential coefficient, decision on this double differential coefficient, and the subtraction are performed by a computer. FIG. 8 shows an example of such a configuration. In FIG. 8, reference numerals 21 and 22 designate analog-to-digital (A/D) converters which respectively convert the analog sum signal $\Sigma$ and difference signal $\Delta$ detected by the detector into digital values. Reference numeral 23 is a computer which calculates the double differential coefficients of the sum signal $\Sigma$ and the difference signal $\Delta$, and determines the sign of the calculated values and further outputs either a value obtained by subtracting the difference signal $\Delta$ from the sum signal $\Sigma$ or a zero value.

According to the present invention, as described above referring to the preferred embodiment, in a processing step of providing a final output signal by subtracting the difference signal of two antennas elements from the sum signal of the two antenna elements, the final output signal is actually output only if the receiving pattern waveform associated with the sum signal has an upwardly convex form, that is, its double differential coefficient is negative and further if the receiving pattern waveform associated with the difference signal has a downwardly convex form, that is, its double differential coefficient is positive, whereby more effective beam compression can be achieved.

What is claimed is:

1. A method for compressing the beam width of the antenna pattern of a radar system including a radar antenna system having two radiating antenna elements of a single monopulse power feed system, comprising the steps of:

scanning said antenna system while transmitting radio waves from said two elements of the antenna system in such a manner that both the radio waves transmitted from the respective elements are in the same phase;

receiving by the antenna system the radio waves which were transmitted from said antenna system and reflected back by scattering objects to said antenna system;

producing both a sum signal and a difference signal of the received signals of said two elements of the antenna system; and performing signal processing comprising the steps of subtracting said difference signal from said sum signal and providing the resulting signal as a final antenna output signal, wherein said signal processing step further comprises the step of providing said final antenna output signal only if a double differential coefficient of a receiving pattern waveform associated with said sum signal is negative and further if a double differential coefficient of a receiving pattern waveform associated with said difference signal is positive whereas providing a zero output signal if the above conditions are not satisfied.

* * * * *